Patented July 28, 1931

1,816,330

UNITED STATES PATENT OFFICE

JOHN L. KEATS, OF WILMINGTON, DELAWARE, ASSIGNOR TO E. I. DU PONT DE NEMOURS & COMPANY, OF WILMINGTON, DELAWARE, A CORPORATION OF DELAWARE

ENAMEL

No Drawing.   Application filed August 4, 1927.   Serial No. 210,723.

This invention relates to enamels and to the art of producing enamels containing as a base a derivative of cellulose, for example, nitrocellulose, cellulose ether, acetyl cellulose, etc.

In making enamels containing a cellulose derivative as a base, for example, the modern pyroxylin enamels, it has been found that many compositions lack what is termed can stability; that is to say, when the composition is allowed to stand for some time, so-called graining occurs. In this case, a more or less coarse, granular material develops in the composition which often ruins the product for use as an enamel. This difficulty is more pronounced with certain combinations of pigments and solvents, but past experience has shown that the difficulty is apt to occur with a number of the pigments commonly used for lacquers, for example, pigments containing zinc, cadmium and some of the pigments containing lead.

The object of this invention is to produce enamels containing a cellulose derivative and having improved stability against graining. Another object is to stabilize pigments so that they may be used in pyroxylin and other cellulose derivative enamels and may be combined with any desired solvent without danger of graining.

According to my investigations, the graining difficulties mentioned above are due to reactions which take place between certain basic components of the pigment and acid components of the vehicle, whereby a crystalline product is formed which is insoluble in the vehicle. For example, in compositions which contain lithopone and ethyl lactate, the cause of the difficulty is that the lithopone contains active zinc compounds, that is, zinc compounds which are soluble in acetic acid, the graining being due to the reactivity of these active zinc compounds with the ethyl lactate or with the lactic acid formed by the hydrolysis of the ethyl lactate, whereby zinc lactate is produced. Zinc lactate, being highly insoluble in the enamel vehicle, crystallizes out retaining occluded and adhering particles. Frequently, this sandy, crystalline material cannot be broken down by any procedure short of severe grinding. Acid components of solvents which tend to induce graining in the presence of basic components include, among others, formic acid, oxalic acid, lactic acid; also compounds containing radicals of these acids, for example, methyl formate, diethyl oxalate, ethyl lactate, etc.

Now I have discovered that these graining difficulties may be overcome by using a pigment which is substantially free from active bases, and by this I mean to imply that the pigment should be substantially free from acetic acid soluble compounds of metals which form relatively water-insoluble oxides having basic properties. Preferably the active basic content of the pigment should be not more than about 0.05 per cent, reckoned as the oxide of the metal in question. For example, zinc pigments such as lithopone, should preferably carry not more than about 0.05 per cent of acetic acid soluble zinc, reckoned as ZnO.

I have also discovered that, (with the exception of those pigments which contain a preponderance of active base components, such as zinc oxide, for example,) pigments which tend to induce graining may be stabilized against the action of solvents by various chemical treatments designed to substantially eliminate the active base content of the pigment. Such chemical treatment preferably reduces the active base content to below 0.05 per cent, reckoned as the oxide of the metal in question. For example, in the case of zinc pigments, such as lithopone, the treatment is preferably carried out so as to reduce the content of acetic acid soluble zinc below 0.05 per cent, reckoned as ZnO.

In general it is sufficient and in any case it is the safer procedure to set the upper limit of allowable active base content of the pigment at 0.05 per cent calculated as above indicated. On the other hand, however, I have found it possible to employ pigments containing as much as 0.1 per cent active base content or even slightly higher amounts, providing the "reaction" of the pigment is controlled so as to compensate in part at least for the higher amount of active basic components thus encountered. In the case of lithopone, for example, if the active zinc content, calculated as ZnO, runs above 0.05 per cent it is desirable that the pigment possess an acid "reaction"—and the higher the basic content, the greater the required acidity. Thus, a lithopone which contains approximately 0.1 per cent acetic acid soluble zinc, calculated as ZnO, should possess a "reaction" in the neighborhood of 6.0 pH, whereas a lithopone containing about 0.05 per cent acetic acid soluble zinc, calculated as ZnO, may be of neutral "reaction," i. e., approximately 7.0 pH. It is obvious therefore, that the lowest, conveniently obtained active base contents are desirable in stabilized pigments since one thus obtains a wide latitude in permissible "reaction" of the product. Lithopones containing approximately .01 per cent to 0.02 per cent active zinc, calculated as ZnO, may be readily prepared according to the stabilizing procedures described below.

Even with pigments stabilized so as to be almost free from active base content, my preferred procedure is to "finish off" the pigment so that its "reaction" is slightly acid, e. g., 6.0 to 6.5 pH. In other words, this preferred "reaction" represents a slight alkalinity to methyl orange and a slight acidity to true neutrality (pH=7.0). Such stabilized pigments will be found to function very satisfactorily under the widest latitude of conditions encountered in the practical production of cellulose derivative enamels.

It is obviously a very simple matter to finish off a pigment having any desired reaction by merely adding required amounts of acid such as sulfuric acid, or alkali such as sodium hydroxide, before filtering at the finish of the stabilizing treatment.

By the term "reaction", I mean the acidity or alkalinity of a pigment as indicated by thoroughly shaking, say 10 grams of the pigment with 50 cc. of fresh redistilled water at about 70° F., and determining the hydrogen-ion concentration, in terms of pH, of the water extract.

"Acetic acid soluble compound", or its equivalent, used throughout this discussion, I mean to define relatively water-insoluble substances of basic character which are extracted by 10 per cent acetic acid at 100° C. (two hours' treatment) and which form crystalline or granular compounds by reacting with acid components of systems characterizing the modern pyroxlyn enamels.

Commercial pigments of the types used in lacquers usually contain various proportions of acetic acid soluble base. For example, the zinc sulfide type pigments such as lithopone and zinc sulfide often contain acetic acid soluble zinc to the extent of 1 per cent or more, reckoned as zinc oxide. To stabilize such pigments for the purpose of this invention, I may treat the pigment with a dilute acid or acidic reagent, such as acetic acid, citric acid, sulfuric acid, sodium bisulfate, etc., to dissolve the active base, following the acid treatment with a washing treatment to remove the dissolved base. Or I may treat with an acid reagent to dissolve the active base and follow by adding a calculated quantity of a reagent designed to precipitate the dissolved base in an inactive form. For example, in the case of zinc sulfide pigments, I may treat with acid to dissolve the acetic acid soluble zinc and follow by a water wash to remove the dissolved zinc or I may follow the acid treatment with the addition of a precipitating reagent, such as sodium sulfide, in amount calculated to precipitate the soluble zinc as the inactive zinc sulfide.

In order to disclose the invention in more detail the following example of an actual embodiment thereof is presented:

Commercial zinc sulfide was used which contained 1.34 per cent acetic acid soluble zinc, reckoned as zinc oxide. The pigment was slurried in water, using 1 part of pigment to 10 parts of water. The slurry was acidified with dilute sulfuric acid, maintaining a pH of 3.8 for one hour with agitation. Washing by decantation was continued until the wash water showed a pH of 6.1 (the water used for wash water gave a pH of 6.2). A control analysis on a sample of the pigment after this wash showed 0.1 per cent acetic acid soluble zinc, calculated as zinc oxide. This basic zinc content, being still higher than desired, a second acid treatment was performed in a manner similar to the first one, except that the slurry was acidified to a pH of 3.3. After the second washing operation, the pigment analyzed 0.041 per cent acetic acid soluble zinc as zinc oxide and gave a pH of 6.0. The material was then filtered, dried and disintegrated. Both the treated and the untreated pigments were tested in lacquers using standard solvent compositions. The lacquers made from the untreated pigment gave grain failures, whereas no grain failures were obtained using the stabilized pigment.

The following coating composition will also serve as a specific embodiment of my invention.

| Constituents | Parts by weight |
|---|---|
| Nitrocellulose | 10 |
| Resin | 20 |
| Softener | 3 |
| Composite solvent containing 10 per cent ethyl lactate | 97 |
| Stabilized lithopone | 30 |

As many apparently widely different embodiments of this invention may be made without departing from the spirit thereof, It is to be understood that I do not intend to limit myself to the specific embodiments thereof except as indicated in the appended claims.

I claim:

1. A non-graining coating composition, comprising a cellulose derivative, a solvent therefor containing a component which tends to induce graining in the presence of a basic component, and a pigment stabilized against graining which, without stabilization, has a normal tendency to induce graining in such a composition.

2. A non-graining coating composition, comprising a cellulose derivative, a solvent therefor containing a component which tends to induce graining in the presence of a basic component, and a pigment stabilized against graining, which contains no more than .1% of acetic acid soluble zinc reckoned as zinc oxide, and has a reaction of substantially 6.0 pH, but which, without stabilization, has a normal tendency to induce graining in such a composition.

3. A non-graining coating composition, comprising a cellulose derivative, a solvent therefore containing a component which tends to induce graining in the presence of a basic component, and a pigment stabilized against graining, which contains no more than .05% of acetic acid soluble zinc reckoned as zinc oxide, and has a reaction of between 6.0 pH and 7.0 pH, but which, without stabilization, has a normal tendency to induce graining in such a composition.

4. A non-graining coating composition, comprising a cellulose derivative, a solvent therefor containing a lactate, and a pigment stabilized against graining, which contains no more than .05% of acetic acid soluble zinc reckoned as zinc oxide, and has a reaction of between 6.0 pH and 7.0 pH, but which, without stabilization, has a normal tendency to induce graining in such a composition.

5. A non-graining coating composition, comprising a cellulose derivative, a solvent therefor containing a lactate, and a pigment of the zinc sulphide type which contains no more than .05% of acetic acid soluble zinc reckoned as zinc oxide, and has a reaction of between 6.0 pH and 7.0 pH.

6. A non-graining coating composition, comprising cellulose nitrate, a solvent therefor containing ethyl lactate, and a pigment of the zinc sulphide type which contains less than .05% of acetic acid soluble zinc reckoned as zinc oxide, and has a reaction of between 6.0 pH and 6.5 pH.

7. The method of stabilizing a pigment which contains a minor percentage of active base components, but which has a normal tendency to induce graining in a cellulose derivative composition containing a component which tends to induce graining in the presence of a basic component, which comprises subjecting said pigment to an acid finishing treatment until it contains no more than .1% of acetic acid soluble zinc reckoned as zinc oxide, and has a reaction of substantially 6.0 pH.

8. The method of stabilizing a pigment which contains a minor percentage of active base components, but which has a normal tendency to induce graining in a cellulose derivative composition containing a component which tends to induce graining in the presence of a basic component, which comprises subjecting said pigment to an acid finishing treatment until it contains no more than .05% of acetic acid soluble zinc reckoned as zinc oxide, and has a reaction of between 6.0 pH and 7.0 pH.

9. The method of producing a non-graining pigmented coating composition, which comprises the stabilization of a pigment, as set forth in claim 8 and mixing said stabilized pigment with a cellulose derivative and a solvent containing a component which tends to induce graining in the presence of a basic component.

10. The method of producing a non-graining pigmented coating composition, which comprises the stabilization of a pigment, as set forth in claim 8, and mixing said stabilized pigment with cellulose nitrate and a solvent containing ethyl lactate.

11. The process of producing a coating composition which comprises incorporating a pyroxylin and a solvent therefor containing a lactate with a pigment having a normal tendency to induce graining in a pyroxylin composition but which has been stabilized against graining by a finishing treatment which comprises acid treating the pigment until the acetic acid-soluble base reckoned as the oxide is not more than 0.1 percent and controlling the reaction of the finished pigment in relation to the content of acetic acid-soluble base within such limits that when the pigment contains substantially 0.1 percent acetic acid-soluble base reckoned as the oxide it has a reaction of substantially 6.0 pH, when the pigment contains less than 0.1 percent and more than 0.05 percent acetic acid-soluble base reckoned as the oxide it has a reaction between 6.0 pH and 6.5 pH, and when the pigment contains no more than 0.05 percent acetic acid-soluble base reckoned as the oxide it has a reaction between 6.0 pH and 7.0 pH.

12. A process of producing a coating composition which comprises incorporating a pyroxylin and a solvent therefor containing a lactate with a pigment of the zinc sulphide type which has been stabilized against graining by a finishing treatment, which comprises acid treating the pigment until the acetic acid-soluble zinc reckoned as zinc oxide is not more than 0.1 percent, and controlling the reaction of the finished pigment in relation to the content of acetic acid-soluble zinc within such limits that when the pigment contains substantially 0.1 percent acetic acid-soluble zinc reckoned as zinc oxide it has a reaction of substantially 6.0 pH, when the pigment contains less than 0.1 percent and more than 0.05 percent acetic acid-soluble zinc reckoned as zinc oxide it has a reaction between 6.0 pH and 6.5 pH, and when the pigment contains no more than 0.05 percent acetic acid-soluble zinc reckoned as zinc oxide it has a reaction between 6.0 pH and 7.0 pH.

In testimony whereof I affix my signature.

JOHN L. KEATS.